United States Patent Office 2,831,022
Patented Apr. 15, 1958

2,831,022

AROMATIC HYDROXY SULFONATE DERIVATIVES AND PRODUCTS AND PROCESSES OF MAKING THE SAME

Lloyd Eugene Van Blaricom and Kenneth Russell Gray, Shelton, Wash., assignors to Rayonier Incorporated, Shelton, Wash., a corporation of Delaware No Drawing. Application August 12, 1952
Serial No. 304,004

7 Claims. (Cl. 260—512)

This invention relates to processes of manufacturing novel derivatives composed mostly of aromatic compounds carrying aromatic hydroxy groups, such as polymeric phenolic substances. These derivatives may be derived as products of chemical reaction from the bark of trees, such as the western hemlock or barks of like chemical characteristics. The invention further relates to the products produced by such processes and especially to those which have been found to be useful for such purposes as additives for controlling the rheological properties of muds used in drilling oil and gas wells. In general, the products are useful as chemical intermediates and for other purposes, including uses for which tannins have heretofore been employed. Our continuation-in-part application, Serial No. 469,302, filed November 16, 1954, describes more fully and claims drilling mud compositions comprising our bark derivatives.

The aromatic alkali sulfonates of the present invention are distinguished, in one important respect, from lignosulfonates in that lignosulfonates are essentially methoxy aromatic compounds which contain only small amounts of aromatic hydroxy groups.

It is one of the objects of the present invention to provide new compositions of matter which are useful as starting materials in the manufacture of other compositions, aromatic chemicals, especially for the manufacture of non-methoxylated hydroxy substituted aromatic compounds.

Another object of the invention is to provide compositions of matter which are useful as deflocculating and dispersing agents.

A further object of the invention is to provide compositions useful as deflocculating or thinning agents in muds used in oil drilling operations and the like.

A still further use is as a replacement for tannins in such uses as boiler water conditioning, tanning leather, as a mordant in dyeing, etc.

Another object is to provide methods for manufacturing the products noted.

Still other objects of the invention will become apparent from the following description.

It has been discovered that water solutions of the sulfurous acid salts of the fixed alkali metals or ammonia react with the insoluble portion of western hemlock bark when the bark is heated with such salts at a suitable elevated temperature and an excess of the sulfurous acid salt is maintained during the operation, and that water soluble alkali sulfonic acid salts of aromatic compounds of the corresponding alkalis are produced which may be easily separated as water solutions from a water insoluble residue. Thus, the insoluble portion of the bark has been found to constitute an important source from which aromatic compounds can be derived. More particularly it has been discovered that aqueous sodium sulfite, aqueous sodium bisulfite and their mixtures react at elevated temperatures with tannin, a large proportion of other constituents of tree bark, and particularly with insoluble relatively non-methoxylated phenolic, aromatic constituents occurring in the bark. These compounds are sodium sulfonate derivatives, or sulfonic acid derivatives, of relatively non-methoxylated polymeric phenolic materials occurring in the bark. They have a very high content of phenolic hydroxyl and are distinguished from lignosulfonates in that lignosulfonates are essentially methoxy aromatic compounds which contain only small amounts of aromatic hydroxy groups. The novel products are water soluble. Certain ones have marked deflocculating and good tanning properties. It is further believed that these alkali salts of sulfurous acid have a three-fold action in forming the new soluble bark derivatives. The first action is visualized as a substitution of the sulfonate groups in aromatic constitutents of the bark as noted above. The second action which may contribute to the increased solubility is thought to be a depolymerizing action of the alkali salts of sulfurous acid particularly in the case of high temperature reactions under pressure with sodium sulfite which may depolymerize very high molecular weight materials of the bark and result in the lower molecular weight products found in the novel products. Thirdly, we believe that the presence of unreacted residual amounts of alkali sulfite and/or bisulfite present in the reaction mixtures minimize decomposition of the phenolic derivatives permitting the solubilizing reaction to proceed at high temperatures without undesirable decomposition. For example, the presence in the reaction mixture of a slight excess of sodium bisulfite or sulfite appears to permit the digestion of western hemlock bark to be carried out at high temperatures so that unexpectedly high yields of product having excellent deflocculating properties may be obtained.

While we do not know the exact mechanism of the protecting action of excess sodium sulfite or bisulfite, we believe it is possible that at elevated temperature there may, in any event, be some oxidation and/or auto-oxidation of polyphenol units containing two or more ortho hydroxy groups to quinone rings and that sodium sulfite may react by sulfonation with the quinone units thus formed, restoring the benzene type ring and creating new phenolic hydroxyl groups generally equivalent in effect to those lost by oxidation. Further irreversible oxidation decomposition is also thereby minimized. By this mechanism, the sodium sulfite or bisulfite would not act directly as an antioxidant and the action might be similar to that postulated for that of sodium sulfite in photographic developers.

However, it is to be understood that the foregoing theory is offered as an aid to the description and that the invention is in no manner limited to the foregoing theories.

The objects of the present invention may be attained in general by digesting the bark at elevated temperatures in the presence of suitable amounts of aqueous ammonium or fixed alkali metal sulfite, or the corresponding aqueous bisulfites, or in mixtures of these solutions, until compositions composed of extracts and derivatives are formed from the naturally occurring compounds contained in the bark. The new compositions are obtained in the most practical manner as well as in higher yield and less dilution by expressing them from the treated bark by pressing which separates from the solid residual unreacted parts of the bark a solution comprising both the part which could readily be separated from the bark by lixiviation and another part comprising material amounts of other compounds which could be removed from the bark only by lengthy and excessive washing if the digested material were merely lixiviated or filtered, as in a filter press. The compounds occurring in the expressed solution may then be recovered for use as solids by evaporation of the water, or the water solutions may be used as such or after evaporation to more or less concentrated form.

The manner of operating the processes of the invention and products of the invention produced thereby are illustrated by the following examples, wherein parts are expressed in parts by weight unless otherwise specified.

EXAMPLE 1

A batch of 14.1 lb. ground western hemlock (*Tsuga heterophylia*) bark (all of which passed a wire screen having openings 7/16 inch by 11/16 inch, equivalent to 6.0 lb. oven-dry bark) was mixed with 45.6 lb. water and 145.8 gm. sodium metabisulfite ($Na_2S_2O_5$). The latter (which contained 5.7% moisture) is equivalent to 150.2 gm. sodium bisulfite ($NaHSO_3$) which is just as suitable as, and can be used instead of, the metabisulfite in this example. The mixture was heated to 85° C. and digested at that temperature for 2 hours. A considerable amount of the sodium sulfite remained. The mixture resulting from this digestion was drained and the solids were washed by showering hot water on the solids retained on a filter screen. The drainings and washings were filtered. The filtered solution of reaction product was concentrated to 40% solids at an absolute pressure of 5 lbs. per sq. in. and subsequently spray dried, leaving a water-soluble solid which when ground to a powder was dark reddish brown. Analysis of the filtered solution showed a gross yield of solids of 14.4% of the weight of the oven-dry bark which comprised organic and inorganic material. The net yield of organic solids derived from the bark was 9.4% of the weight of the oven-dry bark. The inorganic unconsumed $SO_2$ was 13.4% of the solids in solution. The dry product had a methoxy content of 1.9%.

The net yield of organic solids is a measure of the bark material which goes into the product solution and is determined by the formula $$Y = \frac{S_t - S_i}{W} 100$$

where Y is the percent net yield, $S_t$ is the weight of the total solid content of the liquor, $S_i$ is the weight of inorganic salt employed in the process and W is the weight of oven-dry bark treated.

A higher yield of reaction product in a more concentrated solution was obtained by expressing the reaction product in a press, and separating the same from the pulpous bark residue under a pressure of about 200 lbs. per sq. in. A portion of the solubilized products of digestion are included in the bark residue, but nevertheless being water soluble are readily removed from the bark on forcing out the occluded solution as in the expressing operation.

EXAMPLE 2

A batch of 11.2 lb. ground western hemlock bark (similar to that used in Example 1 and equivalent to 6.0 lb. oven-dry bark) was mixed with 47.9 lb. water and 429.0 gm. $Na_2S_2O_5$ (equivalent to 442 gm. $NaHSO_3$). After heating this mixture to 105° C. in a closed rotating vessel, the latter was vented to the atmosphere for the purpose of exhausting entrapped air. The vessel was again sealed and the mixture heated under pressure to 150° C. and digested at that temperature for 2.0 hours. The total reaction period was 3.8 hours. Sulfurous acid salts were still present. After the vessel had been cooled and vented to the atmosphere, the soluble solids in solution were separated from the residual bark and filtered. The resulting filtered solution was spray dried directly, without prior concentration of the solution. Anlyasis of the filtered solution showed a gross yield of solids of 50.4% of the weight of the oven-dry bark which comprised organic and inorganic material. The net yield as expressed in Example 1 was 35.5% of the weight of the dry bark. The inorganic unconsumed $SO_2$ was 5.2% of the solids in solution. The spray dried product had a methoxy content 1.4%.

EXAMPLE 3

A batch of 11.2 lb. ground western hemlock bark having particle size like that of Example 1 was mixed with 47.5 lb. water and 535 gm. sodium sulfite ($Na_2SO_3$). After heating this mixture to 100° C. in a closed rotating vessel, the latter was vented to the atmosphere for removing the air. The vessel was again sealed and the mixture heated to 150° C. and digested under pressure at that temperature for 2 hours. The total reaction period was 3.5 hours. At this time appreciable residual sodium sulfite was present. After the vessel had cooled and opened to the atmosphere, the product of digestion was separated in solution from the residual bark as described in Example 1. The solution had a pH value of 7.5. It was passed through a bed of sulfonic-type cation exchange resin in the hydrogen state thereby removing sodium ions, liberating free sulfurous acid and reducing the pH value of the solution to 2. The resulting solution was then spray dried and is designated as 3a in Table I, wherein other properties of this product are set forth. Prior to the ion exchange treatment the gross yield of solids was 70.0%, the net yield 50.2%, and the unconsumed $SO_2$ in the solution product 2.7% as expressed in the foregoing examples and the unconsumed $SO_2$ in the spray dried product was 0.5%. In treating such solutions with cation exchange resins, the conversion to sulfurous acid begins when the pH is lowered below a value of 4 and the extent of conversion becomes greater as the pH is further lowered. The cation exchange treatment of this soluble polymeric product improved the product by removing extraneous materials.

For the purpose of comparison, a similar digestion was made employing more drastic conditions, namely 5 hours' digestion at 165° C. and in the presence of 10.9% more sodium sulfite. In this digestion nearly all of the $SO_2$ was consumed. The product was similarly recovered. The product is designated as 3b in Table I. In the making of the latter product considerable decomposition of the tannin took place (presumably through oxidation), leaving nevertheless a high net yield of soluble organic reaction product, a large part of which was derived from the insoluble part of the bark.

A lixiviated water extract prepared by a method similar to those heretofore used for preparing tanning extracts was made from the same bark at 85° C. in order to provide for comparison an extract more representative of the true tannin content of the bark. This is designated as 3c in the following Table I.

*Table I*

| Product | Gross Yield, Percent | Net Yield, Percent | Percent Unconsumed $SO_2$ in Solids of Solution | Methoxyl Content, Percent | Hide Powder Tannin, Percent | Yield of Hide Powder Tannin, Percent | Insoluble Solids, Percent |
|---|---|---|---|---|---|---|---|
| 3a | 70.2 | 50.2 | 2.7 | 1.6 | 56.2 | 39.5 | 2.8 |
| 3b | 74.1 | 52.7 | 0.7 | 2.1 | 44.7 | 33.2 | 2.5 |
| 3c | 10.4 | 10.4 | | 2.0 | 50.8 | 5.2 | 21.7 |

The hide powder tanning value listed in the above table is a measure of the concentration of those materials in the extract which combine with a standardized hide powder under conditions specified by the standard method of the American Leather Chemists' Association (ALCA). It is expressed as percent of the total solids in the extract.

The yield of hide powder tannin is a measure of the quantity of tannin (defined above) which is obtained from a given quantity of oven-dry bark. It is expressed as percent of the oven-dry bark. Insoluble solids is a measure of the concentration of those materials in the extract which are insoluble in water under the conditions of the standard hide powder test specified by the ALCA. It is expressed as percent of the total solids in the extract.

By comparing 3a and 3b of Table I, it will be observed that a long drastic extraction in which the most of the sulfite radical was consumed, produced a somewhat higher net yield of organic solids but that the relative proportion and yield of tannins is smaller than when an appreciable amount of excess sulfite remains present. It follows that the character of the products can be influenced somewhat by the depletion of the sulfurous acid radical at the expense of the tannins. By comparison of the extract 3c with the products of digestion 3a and 3b, it will be observed that the yield of hide powder tannin from the bark used is insignificant in the extract, as compared to the yield of tannin in the products of sodium sulfite digestion calculated on the same basis. It follows that relatively much more tannin has been produced by the reaction than present in soluble form in the bark in its original form. Relatively the insoluble solids in the extract 3c is high as compared to the insignificant amounts in the digestion products. Accordingly, the yields of total soluble material and the yields of tannins in the soluble materials are both high per unit of bark, as compared to the yields obtained by lixiviation.

EXAMPLE 4

The effects of the products of the foregoing examples were tested on typical soda drilling muds. A mixture of 129 gm. Wyoming bentonite, 1158 gm. native Texas clay, and 10,000 gm. water was made by stirring them together for 2 hours. The mixture was aged 24 hours without stirring and was subsequently mixed by stirring at slow speed for 0.5 hour. This typical soda drilling mud was then divided into several 600 cc. batches for evaluating the spray dried western hemlock bark products described in Examples 1 and 3a For this purpose 3.4 gm. of the dry product were blended into 600 cubic centimeters of the mud (equivalent to 2.0 lbs. additive per barrel of mud) at slow speed. The mixture was again stirred slowly while 40% sodium hydroxide solution was added. Two typical samples of drilling mud were made. Sodium hydroxide was added to one of these mixtures until the pH value reached 8.5 and to the other until the pH value was 12.0. The products of Examples 1 and 3 were added to different samples of these mixtures. They were then stirred at high speed for 5 minutes and tested by standard API (American Petroleum Institute) procedures. Typical results of such tests are shown in Table II.

Table II

| Type of Product Added to Mud | Quantity of Product Added to Mud, lb./bbl. | pH | Viscosity, Centipoises | Gel Strength, gm. 0 min. | Gel Strength, gm. 10 min. | Filtration, ml., 30 min. |
|---|---|---|---|---|---|---|
| NaHSO₃ Digested at 85° C | 0 | 8.5 | 11.75 | 18.9 | 55.5 | 14 |
|  | 2.0 | 8.5 | 8.3 | 13.7 | 35.4 | 11 |
| (Spray dried Product of Example 1) | 0 | 12.0 | 40.0 | 90.1 | 191.0 | 14.5 |
|  | 2.0 | 12.0 | 3.2 | 3.5 | 27.9 | 8.5 |
| Na₂SO₃ Digested at 150° C | 0 | 8.5 | 11.75 | 18.9 | 55.5 | 14.0 |
|  | 2.0 | 8.5 | 9.3 | 17.3 | 27.4 | 12.5 |
| (Spray dried Product of Example 3a) | 0 | 12.0 | 40.0 | 90.1 | 191.0 | 14.5 |
|  | 2.0 | 12.0 | 3.4 | 3.2 | 11.6 | 9.5 |

The effects of the products of the foregoing examples were also tested in typical lime base drilling muds. The following is a typical illustration.

EXAMPLE V 275 gm. Wyoming bentonite, 825 gm. native Texas clay, and 9,000 gm. water were mixed at slow speed for 2 hours. The mixture was aged 72 hours without stirring and was subsequently mixed 0.5 hour at slow speed. 600 cc. of this mud was mixed for 5 minutes at high speed with a mixture containing 6.1 gm. calcium hydroxide, 20 gm. water, 5.1 gm. NaOH (equivalent to 3 lbs. NaOH per bbl. mud). This is a typical composition which upon treatment with a suitable deflocculant constitutes a lime base drilling mud.

Then 5.1 grams (equivalent to 3 lbs. per bbl. of mud) of the spray dried product of Example 1 from hemlock bark were added. For comparison a sample of the mixture before adding the deflocculant was also tested. The final mixtures were tested by standard API procedures and typical results are shown in Table III.

Table III

| Additive Used | Quantity of Additive, lb./bbl. | Viscosity, Centipoises | Gel Strength, gm. 0 min. | Gel Strength, gm. 10 min. | Filtration, ml. 30 min. |
|---|---|---|---|---|---|
| NaHSO₃ Extract at 85° C (Spray dried Product of Example 1) | 0 | (¹) | (¹) | (¹) | (¹) |
|  | 3.0 | 12.0 | 5.3 | 61.7 | 16.2 |

¹ Too high to test.

Bark from the trees is usually obtained in large pieces which for the purpose of digestion in the present processes may desirably be reduced in size to pass screens of about 4 to about 20 meshes to the inch in order to avoid an excessive amount of void space in the charge and to aid penetration of the reacting solution. This may be accomplished by conventional means as by a hammer mill or attrition mill. As an operating expedient, it is also desirable to avoid excessive amounts of fines, such as bark dust which sometimes clog filters, although such fines are in condition for rapid digestion. It has been found that digestion temperatures ranging from about 50° C. to about 200° C. can be used. In using the lower temperatures longer digestion periods are desirable but temperatures as high as 200° C. can be used for digestions of considerable length, say for example for an hour, without consuming all of the sulfurous acid salts or materially decomposing the organic products. For digestions which are both rapid and relatively efficient, temperatures of about 75° C. to about 165° C. are preferred. Digestion periods of about 0.5 hour to about 4.0 hours are used, but at all events the digestions are stopped while there still remains some content of sulfurous acid salt in the charge. Digestion for more than 4 hours introduces the increasing liability of decomposition without material improvement in yields while digestions of materially less than thirty minutes even at temperatures about 100° C. rarely produce good yields. A smaller proportion of the alkali sulfurous acid salt than that equivalent to about 0.01 part of sulfur dioxide per part of oven dry bark is insufficient, while more salt than that equivalent to about 0.30 part sulfur dioxide per part of oven dry bark is more than is needed to carry out the reaction satisfactorily. However, an excess over the latter proportion can be used, provided the inorganic salts resulting from such excessive amounts are not deemed deleterious in the solutions of water-soluble products derived from the processes.

In using the subdivided bark of the sizes indicated, about 10% to about 20% of the bark on the basis of its equivalent oven dry weight is desirable in the charge, the rest of the charge being water and the sulfurous acid salt of sodium or of any of the other alkali metals, such as potassium or lithium or of ammonium hydroxide. However, the amount of water is not critical, except that some water must be present. The amounts of water indicated are preferable since such amounts provide water to act as solvent for the inorganic material and for the aromatic sulfonates formed, as well as to provide the presence of water and sulfurous acid radical in the reaction mass. Amounts of water in excess of the proportions indicated may be present when barks of the size indicated are used, but water in excess of such proportions tend to slow the reaction by dilution of the chemical, serve in general to require excessive space in the digesters, and eventually to give a very dilute product solution requiring a correspondingly costly evaporation to produce the solids in the form of concentrated solutions or in dry form. In general it is desirable but not necessary to agitate the charge in the digester, although continuous mixing reduces somewhat the time of reaction. The digestion equipment and physical condition of the bark must be capable of bringing the bark material and water solution of alkali sulfurous acid salt into intimate contact. Depending upon the temperature, the reaction may be conducted in an open vessel or in a closed pressure vessel. Either batch or continuous operations may be carried out in a single stage or in a multiplicity of stages. The sulfurous acid salts of sodium are satisfactory, and although such salts of the other fixed alkalis can be used, economy of operation in many cases indicates the use of sodium salts.

Following the digestion, the products of the reaction as well as any other water soluble material are separated from the insoluble bark residue. Some of the products of reaction are contained in solution occluded in the bark residue and in view of their relatively high molecular weight and slow diffusion rates the separation of this material by washing operations dependent on diffusion has disadvantages, though, however, still representing considerable improvement over older procedures of lixiviating undigested bark. Such separation of occluded reaction materials simply by washing involves uneconomic dilution, and is not even relatively complete unless many changes of water and prolonged soaking periods for diffusion are provided.

Effective and rapid separation of all soluble products of digestion is preferably accomplished by mechanical dislodging aids. Such mechanical dislodging aids or expressing means effectively separate occluded solution and the soluble reaction product contained therein from the bark residue. Expressing, as by compressing the mixture of watery material and bark residue in a continuous screw press or in a batch hydraulic press, is especially effective, in that solutions of maximum concentration are producible. Using batch pressing it will frequently be found desirable to re-slurry the pressed residue in water and repress.

The yield of soluble product per unit of starting material effected by mechanical aids, such as expressing methods as compared to processes in which the adherent soluble product is dissolved out of the final reaction mass by simply adding washwater, as for example by extraction or lixiviation, is illustrated as follows.

EXAMPLE VI

A digestion similar to Example I was carried out by mixing 506 grams of comminuted hemlock bark (equivalent to 300 grams oven-dry bark) with 2478 ml. of water in which 16.1 grams of sodium metabisulfite (equivalent to 16.6 grams $NaHSO_3$) had been dissolved. The mixture was digested for 2 hours at 85° C. with agitation. Sodium bisulfite was present in the solution at the end of digestion.

The resulting reaction mixture was allowed to drain yielding 1480 ml. of solution and the resulting mass was then pressed in a hydraulic press under a pressure of 310 lbs. per square inch thereby expressing an additional 715 ml. of solution.

The pressed bark residue was then slurried with 2000 ml. of water for ½ hr. at 85° C. The mixture was then drained and the residue repressed as before, the drainings amounting to 1160 ml. and the pressings to 690 ml. All of the pressings and drainings were combined.

The soluble product was thus obtained from the digester in a yield of 15.6% of the oven-dry weight of the bark and at a concentration of 1.16%.

Illustrative of the effect of removing occluded solubilized material from the bark residue by lixiviation, rather than by expressing, a bisulfite bark digestion was carried out exactly as described above. Following the digestion, the mixture of solution and bark residue was allowed to drain but, without any pressing operation, the bark mat was washed with water (displacement washing) until the total volume of drainings and washings was equal to the volume of solution obtained above. A total yield of only 11.6% soluble product on the oven-dry weight of the bark was obtained in a solution having a concentration of only 0.8%.

Illustrative of the effect of a considerably more prolonged lixiviation on removal of occluded soluble material from the bark residue, a bisulfite digestion was carried out exactly as described above, but after allowing the mixture to drain, the mat was lixiviated for a considerably greater period than that necessary to obtain the volume of product solution obtained in the two foregoing operations. The total volume of drainings and washings so collected was 8200 ml. (equivalent to about 2.9 times the volume of solution obtained above). At the time of discontinuance of lixiviation, the effluent solution contained a very low concentration of product (0.05%). The total yield of product thus obtained was 12.9% of the dry weight of the bark, but this was obtained in very dilute solution having a concentration of only 0.45%. The result, therefore, as compared to Part B was only an insignificant increase in yield and a disadvantageous dilution of the solution.

To recover the product from this solution in dry form would require evaporating 221 lbs. water per lb. dry product obtained. By comparison, a dry product could be obtained from the solution of the first product of this example by evaporating only 85 lbs. water per lb. of dry product.

The solutions usually contain a small amount of insoluble material such as bark in fine subdivision which, if desired, may be separated by filtration. The products may be used in the form of water solutions of suitable concentrations or in the form of solids. Concentration of the solutions may be effected by known methods of evaporation, spray drying and like, either at atmospheric or reduced pressure, but temperatures not exceeding those used in the digestion of the bark are preferable in order to avoid degradation of the phenolic material present. Solid products may be produced by known methods, such as spray drying and drum drying, conducted at atmospheric or reduced pressures, preferably avoiding excessive temperatures and oxidizing conditions which would affect the tannins where further reactions are not desired.

The bark of western hemlock trees is composed mostly of water-insoluble material, including a large proportion of insoluble hydroxy aromatic material, but varying small proportions of various water-soluble tannins are present. A considerable proportion of the insoluble part of the bark is converted by the present process of digestion into water-soluble alkali sulfonate salts of hydroxy aromatic compounds. Besides these organic salts, the water-soluble solids in the reaction product comprise alkali sulfurous and sulfuric acid salts derived from the charged inorganic salts. A small but varying proportion of such salts are sulfurous acid salts. The ratio of organic to inorganic material present in the solid product varies and depends upon a number of factors among which are the amount of convertible material in the bark, the amount of the insoluble proportion of the bark material converted and the proportion of bark to inorganic sulfurous acid salt used in the charge. Typical oven dried products produced from western hemlock bark and sodium salts contain up to about 30% inorganic material and the remainder organic material. The organic material contains aromatic compounds, and will have relatively large proportions of phenolic hydroxy groups in important amounts, so that the compositions derived from the products of the present reaction constitute an important source of raw organic material of the kinds indicated. All of the products are useful as reactants or raw materials from which to manufacture other organic compounds.

Typical of the products produced in solution from the bark of western hemlock as well as those obtained by evaporation to dryness of the solutions derived from the bark are the novel compositions having unique properties which have been found to be especially useful as deflocculating agents, as for example deflocculants for the treatment of oil well drilling muds. These novel derivatives obtained from western hemlock bark also have good tanning qualities and can be produced by the processes of the present invention. The yield of tannins per unit of bark is in far greater proportion than can be obtained by treating the same bark by the lixiviation processes of the prior art. While the lixiviation processes do not produce yields comparable in quantity to those of the processes of the invention, the processes of the invention produce kinds of organic materials not contained in material amounts, or not at all, in lixiviation products. Moreover, the combinations of materials and properties of the compositions of the present invention are novel for reasons which were by no means apparent.

Large quantities of hemlock logs are transported to pulp mills by floating in rafts in the ocean. If the bark from such logs is used in the process of the invention, the soluble reaction products obtained will contain, in addition to the other constituents, appreciable amounts of sodium chloride. There is however a special advantage in applying to such bark the process of the invention, rather than simple water lixiviation, since the far higher yields obtained in our processes result in a proportionately much lower contamination of the extracts with sodium chloride. Thus, the products of the invention may be used for many deflocculating purposes without removing the amount of salt introduced by sea water. For use however, where it is necessary or desirable to have substantial freedom from sodium chloride, we find that the products may be readily freed from contaminating sodium chloride and other inorganic salts by passing them through either alternate or mixed beds of cation and anion exchange resins of the types conventionally used in water purification. We have made the surprising discovery that the sodium sulfonate salts of the aromatic materials produced in accordance with the processes of the present invention are not removed by the anion exchange resins even though they are salts of strong acids. The reason appears to be that such polymeric organic materials are of such large molecular size as to be unable to penetrate the pores of resins of the porosity used in conventional water purification. The anion exchange resins therefore act as "molecular sieves," removing the chloride, sulfite, sulfate, etc. of sodium, potassium, etc. and other small inorganic anions but rejecting the large aromatic sulfonate polymeric organic anions. Thus a part of the inorganic salts in the product or all of them can be removed.

This novel ion exchange process comprises contacting the mixed solution of alkali salt and alkali sulfonates of aromatic compounds with the anion exchange material in basic form for removing anions such as chloride or sulfite ions and with a cation exchange material in acid form to remove alkali ions such as sodium. The condition of the anion exchange material is important. It must be a material of pore-size which is small, but in which the pore-size is large enough to permit the molecules of the inorganic salt to permeate the solid exchange material. On the other hand the pores of the anion exchange material must be so small that the large molecules of the organic alkali sulfonates cannot permeate the material. The anion exchange material may be one capable of adsorbing either strong or weak acids but must be in basic form. Thirdly any anion exchange material may be present only in the amount necessary to adsorb that part of the anion of the inorganic salts sought to be effective, or it may be present in excess where the anion of all the inorganic salts present in the solution are to be removed.

An anion exchange material having suitable pore-size can be selected empirically by firstly treating water solutions of an inorganic acid of the inorganic salts sought to be removed, with anion exchange materials which are in basic form, thereby to select anion exchange materials which have pores large enough to admit the anions sought to be removed and which will remove the inorganic acid ions. Then a further selection is made by treating the materials thus selected with a solution of the sulfonated organic polymeric material sought to be retained in solution, the same being in the free acid form, thereby to select those resins which will not be penetrated by the organic molecules. In order to prepare the solution of organic material in acid form, the alkali sulfonic acid group of the aromatic polymeric compound used in the second selection is transformed to the free acid form by treating the alkali sulfonate of the aromatic polymeric material with a sulfonic acid type cation exchange resin in acid form in order to remove the alkali ion. Finally those anion exchange resins selected in the second or further selection will have a pore-size suitable for screening out the larger molecules or the alkali sulfonates of the organic polymeric compounds of our products. The most of the known anion exchange resins in which the basic groups are quaternary ammonium groups and which are suitable for treating potable water have suitable pore-size for the purpose of the present processes.

The quaternary ammonium type anion exchange resins of suitable pore-size may be used in any of the three arrangements specified below. The anion exchange resins of suitable pore-size in which the basic groups are amino groups may be used in processes numbered (1) and (2) below, but not in (3). Where the solutions are treated singly, first by one ion exchange resin and then by the other type of resin, the first resin used must be either a strongly base anion exchange resin in its basic form, such as a quaternary ammonium type exchange resin in its basic form; or alternatively a strong-acid cation type resin in its acid form, such as a sulfonic acid type cation exchange resin in its acid form, as the case may be. The solutions containing the inorganic salts and the alkali sulfonates of aromatic polymeric compounds are treated in any of the following arrangements of ion exchange material.

(1) A mixed bed of carboxylic acid type cation exchange material in acid form and either a quaternary ammonium or an amino type anion exchange material, the latter being in basic form. This modification is preferred.

(2) Treatment of the solution with a sulfonic acid type of cation exchange material in acid form followed by an anion exchange resin in basic form in which the basic groups are amino groups or quaternary ammonium groups.

(3) Treatment of the solution with a quaternary ammonium strong type anion exchange material in basic form followed either by a sulfonic acid type or a carboxylic type cation exchange material in acid form.

In every case the pore-size of the anion exchange resin must be small as described above and it must be in the basic form, so that the molecules of alkali inorganic acid salts and not the large molecules of the organic material may pass into and through the pores and permeate the solid, thereby producing a contact condition enabling the adsorption exclusively of the inorganic acid ions of the inorganic salts.

The following example further illustrates the removal of sodium sulfite an dother inorganic salts from the polymeric organic alkali sulfonates. The purification is effected by contacting the solution containing the inorganic salts and the alkali sulfonates of aromatic polymeric compounds with both a cation and an anion exchanger, the anion exchanger having a pore-size sufficient to permit the penetration of inorganic molecules and the adsorption of inorganic ions of such molecules, but of insufficient size to permit penetration of the large organic sulfonate molecules, thereby to produce the purified form of product.

EXAMPLE VII

Four hundred grams of the spray dried product made by the process of Example I containing 3.5% unconsumed $SO_2$ were dissolved in 1500 ml. water. The solution thus obtained was treated with a cation exchange resin of the sulfonic acid type (Dowex 50, known to be a sulfonic cross-linked polystyrene in the acid state) until the pH of the solution had dropped to 1.5. This removed the sodium ions of the sodium bisulfite. The solution was then drained off and treated with an anion exchange resin of the strongly basic quaternary ammonium type (Amberlite IRA-400, believed to be a quaternary ammonium derivative of chlormethylate cross-linked polystyrene which was in the basic state) until no bisulfite was detectable in the solution. The solution was then drained off and dried in a small spray dryer. The original spray dried product and the purified spray dried product were analyzed for tanning by the methods of the Official American Leather Chemists' Association. The results showed that the tannin content of the dry product was raised from 49.2% based on dry solids, to 59.8 by the ion exchange treatment.

In general, the molecular weight of polymeric materials such as those produced by the processes of the present invention vary approximately inversely as the cube root of their diffusion coefficients as determined by methods such as the one hereinafter described. Accordingly, the diffusion coefficients of quebracho extracts and the diffusion coefficients of typical bark aromatic sulfonates of the invention which operate somewhat similarly to quebracho extracts as deflocculating agents in drilling muds were measured according to the general procedure published for lignosulfonates by Felicetta, Markham, and McCarthy in the Journal of the American Chemical Society, vol. 71, page 2879, August 1949. It was found that the average diffusion coefficients of the products of the present invention tested were values of about 20 to about 26 which represent molecular weights of about 2880 to about 1310, whereas the corresponding value for quebracho extracts is 16.8 which corresponds to a molecular weight of 4860. Modifications were made in the method and apparatus for determining the diffusion coefficient which involved adding a quartz lens to a Beckman model DU spectrophotometer in such a manner as to focus the image of the slit sharply on the diffusion coefficient cell. Secondly, since the soluble sulfonated products of the invention are polydisperse, it was necessary to measure the average diffusion coefficient in a purely arbitrary but reproducible manner, and the value of $C_x/2C_0$ was therefore read from the probability plot at $x=10$ mm. Measurements were carried out at a wave length of 277.7 millimicrons.

Relative molecular weights may be determined from the values of D obtained by the foregoing method by applying the Stokes-Einstein equation which assumes spherical non-interacting, nonhydrated molecules. By applying this formula to the values of D the molecular weights shown in Table IV were obtained.

Table IV

| Product | Average Diffusion Coefficient of Material (mm.²/day) | Average Molecular Weight |
|---|---|---|
| Digestion Product with NaHSO₃ at 85° C. (Example 1) | 20.3 | 2,740 |
| Digestion Product with NaHSO₃ at 150° C. (Example 2) | 20.2 | 2,790 |
| Digestion Product with Na₂SO₃ at 150° C. (Example 3a) | 26.0 | 1,310 |
| Digestion Product with Na₂SO₃ at 165° C. (Example 3b) | 25.8 | 1,338 |
| Quebracho Extract | 16.8 | 4,860 |

We claim:

1. A water-soluble composition comprising alkali sulfonic acid salts of low-methoxy hydroxy aromatic polymeric compounds and inorganic alkali salts resulting from digesting Western hemlock bark in an aqueous solution of a salt of sulfurous acid of the group consisting of the salts of ammonium, sodium and potassium sulfite and bisulfite at a temperature of from 50° C. to 200° C., maintaining said salt of sulfurous acid in the solution during digestion, said digestion being continued until most of the sulfurous acid radical of the salt of sulfurous acid is consumed in forming the water-soluble composition, and separating from the bark in the aqueous solution the alkali sulfonic acid salts of low-methoxy hydroxy aromatic phenolic compounds.

2. A water-soluble composition according to claim 1 in which the digesion is carried out in an aqueous solution in which the sulfur dioxide of the sulfurous acid salt and bark are in the proportion of 0.01 to 0.30 part of sulfur dioxide to one part of bark.

3. The process of making a water-soluble derivative from hemlock bark which comprises digesting the bark in an aqueous solution of a salt of sulfurous acid of the group consisting of the salts of ammonium, sodium and potassium at a temperature of from 50° to 200° C., maintaining said salt in the solution during the digestion, said digestion being continued until part of the sulfurous acid radical of the salt of sulfurous acid is consumed in forming the water-soluble derivative, and separating from the bark a solution containing the water-soluble derivative.

4. The process according to claim 3 in which the sulfur dioxide of the sulfurous acid salt and bark in the mixture treated are in the proportion of about 0.01 to 0.30 part of sulfur dioxide to one part of bark.

5. The process according to claim 3 in which the digestion temperature is from 75° to 175° C.

6. The process according to claim 3 which comprises evaporating water from the separated solution to form a solid water-soluble bark derivative.

7. The process of removing alkali metal salts of inorganic acids from a water solution which contains a mixture of said salts and alkali sulfonates of aromatic polymeric compounds which comprises contacting said mixed solution with both cation exchange material in acid form and anion exchange material in basic form until the ions of the inorganic salt are selectively adsorbed by said ion exchange materials; and then separating the resulting solution from the ion exchange material; said mixture of alkali inorganic salts and alkali sulfonates of aromatic polymeric material being made by heating together western hemlock bark, water and an alkali salt of sulfurous acid of the group consisting of ammonium and the fixed alkali metals, to a temperature of about 50° C. to about 200° C. until a portion of the insoluble part of the bark is converted to water-soluble hydroxy aromatic alkali sulfonate compounds; and separating the water-soluble part of the heated mixture in water solution; said anion exchange material having pore-size sufficiently large to permit molecules of the inorganic acid alkali salts to penetrate the material but being too small to be pervious to the larger organic molecules.

References Cited in the file of this patent

UNITED STATES PATENTS

| | | |
|---|---|---|
| 1,303,177 | Drewsen | May 6, 1919 |
| 2,204,539 | Wassenegger | June 11, 1940 |
| 2,240,116 | Holmes | Apr. 29, 1941 |
| 2,388,222 | Behrman | Oct. 30, 1945 |
| 2,491,437 | Perkins | Dec. 13, 1949 |
| 2,528,349 | Farber | Oct. 31, 1950 |
| 2,549,142 | Thompson | Apr. 17, 1951 |
| 2,559,529 | Bauman | July 3, 1951 |
| 2,597,809 | Miglarese | May 20, 1952 |
| 2,674,594 | Lewis et al. | Apr. 6, 1954 |
| 2,698,233 | Lewis et al. | Dec. 28, 1954 |

OTHER REFERENCES

Potter et al.: Industrial & Engineering Chem. (1944), vol. 36, pps. 1148–1149.

Wood Chemistry (Wise), 2nd ed., Rheinhold, vol. 2, New York, 1952 (1021–23).